(12) United States Patent
Azor et al.

(10) Patent No.: US 8,115,698 B2
(45) Date of Patent: *Feb. 14, 2012

(54) METHODS AND SYSTEMS FOR IMAGE PROCESSING AND DISPLAY

(75) Inventors: Frank C. Azor, Miami, FL (US); Mark A. Casparian, Miami, FL (US); Reginald I. Rego, Miami, FL (US)

(73) Assignee: Dell Products, L.P., Round Rock, TX (US)

( * ) Notice: Subject to any disclaimer, the term of this patent is extended or adjusted under 35 U.S.C. 154(b) by 826 days.

This patent is subject to a terminal disclaimer.

(21) Appl. No.: 12/151,999

(22) Filed: May 12, 2008

(65) Prior Publication Data

US 2009/0059103 A1    Mar. 5, 2009

Related U.S. Application Data

(60) Provisional application No. 60/966,419, filed on Aug. 28, 2007.

(51) Int. Cl.
*G09G 5/00* (2006.01)
(52) U.S. Cl. .................. 345/1.1; 345/4; 345/5
(58) Field of Classification Search ............... 345/1.1, 345/4, 5, 6
See application file for complete search history.

(56) References Cited

U.S. PATENT DOCUMENTS

| | | | |
|---|---|---|---|
| 4,859,994 A * | 8/1989 | Zola et al. ................. 345/9 |
| 5,488,496 A * | 1/1996 | Pine ........................ 349/96 |
| 5,619,219 A * | 4/1997 | Coteus et al. .............. 345/7 |
| 5,793,470 A | 8/1998 | Haseltine et al. |
| 5,963,371 A | 10/1999 | Needham et al. |
| 6,252,570 B1 * | 6/2001 | Mangerson ................. 345/87 |
| 6,262,843 B1 | 7/2001 | Marx |
| 6,642,977 B2 | 11/2003 | Kotchick et al. |
| 6,717,728 B2 | 4/2004 | Putilin |
| 6,985,290 B2 * | 1/2006 | Putilin et al. .............. 359/462 |
| 7,128,420 B2 | 10/2006 | Kapellner et al. |
| 7,369,099 B2 * | 5/2008 | Arai et al. ................. 345/1.1 |
| 7,626,594 B1 * | 12/2009 | Witehira et al. ............. 345/619 |

(Continued)

FOREIGN PATENT DOCUMENTS

JP            02116826 A       5/1990

(Continued)

OTHER PUBLICATIONS

Office Action received in U.S. Appl. No. 12/152,009 to Azor, "Method and Systems for Projecting Images", Feb. 15, 2011, 25 pgs.

(Continued)

*Primary Examiner* — Amare Mengistu
*Assistant Examiner* — Premal Patel
(74) *Attorney, Agent, or Firm* — O'Keefe, Egan, Peterman & Enders LLP

(57) ABSTRACT

Methods and systems for displaying or projecting images that may be implemented to provide the ability for a user of an information handling system to view a selected image on a display or projection screen privately, while allowing other images to appear on the display or projection screen which are publicly viewable to other users who cannot see the privately-displayed image. With appropriate intervening polarization, a user may be allowed to view the private image as well as any displayed or projected publicly viewable images, and the private image and publicly viewable images may be optionally simultaneously displayed or projected if so desired.

27 Claims, 6 Drawing Sheets

U.S. PATENT DOCUMENTS

| | | | |
|---|---|---|---|
| 7,705,935 B2* | 4/2010 | Gaudreau | 349/96 |
| 2002/0158967 A1 | 10/2002 | Janick et al. | |
| 2003/0025667 A1 | 2/2003 | Yerazunis et al. | |
| 2003/0026449 A1 | 2/2003 | Yerazunis et al. | |
| 2003/0037243 A1 | 2/2003 | Gruteser et al. | |
| 2003/0122828 A1 | 7/2003 | Lukyanitsa | |
| 2004/0017362 A1 | 1/2004 | Mulligan et al. | |
| 2004/0130788 A1 | 7/2004 | Minami | |
| 2004/0208394 A1 | 10/2004 | Kurata | |
| 2005/0002585 A1 | 1/2005 | Brauckmann et al. | |
| 2005/0052341 A1* | 3/2005 | Henriksson | 345/4 |
| 2005/0094362 A1 | 5/2005 | Stephens | |
| 2005/0146787 A1 | 7/2005 | Lukyanitsa | |
| 2005/0162336 A1* | 7/2005 | McClintock et al. | 345/1.1 |
| 2006/0061516 A1* | 3/2006 | Campbell et al. | 345/1.1 |
| 2006/0119537 A1* | 6/2006 | Vong et al. | 345/1.3 |
| 2006/0215261 A1 | 9/2006 | Sato | |
| 2006/0244919 A1 | 11/2006 | Chuang | |
| 2007/0008314 A1* | 1/2007 | Song et al. | 345/419 |
| 2007/0035830 A1* | 2/2007 | Matveev et al. | 359/464 |
| 2007/0047043 A1 | 3/2007 | Kapellner et al. | |
| 2007/0091011 A1* | 4/2007 | Selbrede | 345/4 |
| 2007/0195010 A1* | 8/2007 | Toriumi et al. | 345/1.3 |
| 2007/0296889 A1* | 12/2007 | Struyk | 349/96 |
| 2010/0090928 A1* | 4/2010 | Maeda et al. | 345/4 |
| 2011/0089233 A1* | 4/2011 | Locher | 235/380 |

FOREIGN PATENT DOCUMENTS

| WO | WO2005/096740 A2 | 10/2005 |
|---|---|---|

OTHER PUBLICATIONS

Azor et al., "Method and Systems for Projecting Images", U.S. Appl. No. 12/152,009, Office Action, 24 pgs.

Azor et al., "Method and Systems for Projecting Images", U.S. Appl. No. 12/152,009, Amendment and Response to Office Action, Mailed Apr. 18, 2011, 28 pgs.

Neurok Optics, IZ3D, LM17, User's Manual, Publicly available prior to the Aug. 28, 2007 filed of provisional U.S. Appl. No. 60/966,419 from which the present application claims priority; 12 pgs.

Woods, "Compatibility of Display Products With Stereoscopic Display Methods", Feb. 2005, 4 pgs.

Media Chance, DVD-Lab, 3D Video Stereoscopy, "Experimenting with 3D Video", Printed From Internet on Apr. 27, 2007, 6 pgs.

Video/Imaging Design Line, Techonline Community, "PCV530, An Affordable PVR and TV solution for the PC", May 26, 2007, 4 pgs.

Starks, "Stereoscopic Imaging Technology", Printed From Internet on Apr. 18, 2007, 23 pgs.

Azor et al., Copending Application, "Methods and Systems for Projecting Images", filed on the same date as the present application; 46 pgs.

Tarr, "TI Demonstrates "Dual View" Capability for DLP", this reference describes Dual View Technology that existed before the Aug. 28, 2007 filing date of provisional U.S. Appl. No. 60/966,419 from which the present application claims priority; 2 pgs.

"DLP's DualView Technology" Audioholics Home Theater Reviews and News, this reference describes Dual View Technology that existed before the Aug. 28, 2007 filing date of provisional U.S. Appl. No. 60/966,419 from which the present application claims priority; 2 pgs.

Block, "CES 2008: DLP Premiers DualView, Allows One TV to display two full screen video sources at the same time" this reference describes Dual View Technology that existed before the Aug. 28, 2007 filing date of provisional U.S. Appl. No. 60/966,419 from which the present application claims priority; 1 pg.

Azor et al., "Method and Systems for Projecting Images", U.S. Appl. No. 12/152,009, Final Office Action, 31 pgs, date: Aug. 17, 2011.

Azor et al., "Method and Systems for Projecting Images", U.S. Appl. No. 12/152,009, Amendment and Response; Oct. 13, 2011, 28 pgs.

Azor et al., "Method and Systems for Projecting Images", U.S. Appl. No. 12/152,009, Advisory Action; Nov. 15, 2011, 4 pgs.

Azor et al., "Method and Systems for Projecting Images", U.S. Appl. No. 12/152,009, RCE and Amendment; Dec. 19, 2011, 28 pgs.

* cited by examiner

METHODS AND SYSTEMS FOR IMAGE PROCESSING AND DISPLAY

This patent application claims the benefit of U.S. Provisional Patent Application Ser. No. 60/966,419 entitled "Methods And Systems for Image Processing And Display", filed Aug. 28, 2007, which is incorporated herein by reference.

RELATED APPLICATIONS

The present provisional application is related in subject matter to concurrently filed patent application Ser. No. 12/152,009, entitled "Methods And Systems For Projecting Images" by Frank Azor et al.

FIELD OF THE INVENTION

This invention relates generally to image display and image processing and, more particularly, to image display and image processing by an information handling system.

BACKGROUND OF THE INVENTION

One type of conventional stereoscopic three dimensional imaging systems utilizes a dual panel display system that includes a front transmissive LCD display panel and a rear transmissive LCD display panel disposed in spaced relationship and substantially optically aligned with each other so that an image produced by the rear LCD display panel passes through the front LCD display panel. The principle of this 3D technique is based on polarized light to create images for left and right eye viewing. Left and right eye images are created by dynamically changing the polarity of each pixel. To control the liquid crystal twist, an electric field is applied. Varying the electric field on a per pixel basis results in polarization angles anywhere from 45 degrees to 135 degrees. The user wears passive linearized-polarizer glasses, with the left lens containing a 45 degree axis, and the right lens containing a 135 degree axis. As so viewed together by the viewer, the two images produce a perception of three dimensions to the viewer. One example of such a commercially-available stereoscopic dual panel LCD display system is known as an iZ3D stereoscopic display monitor available from Neurok Optics of San Diego, Calif.

Each of the front and rear display panels of the above-described conventional stereoscopic three dimensional imaging system is transmissive to light produced by a back light positioned behind the rear LCD display panel. A diffuser is present between the rear LCD panel and front LCD panel. The rear LCD display panel includes a rear LCD display layer, an input polarizer layer positioned adjacent the rear LCD panel between the back light and the rear LCD display layer to create a plane polarized background light, and an output polarizer layer positioned adjacent the rear LCD display layer between the rear LCD display layer and front LCD panel. The rear LCD display layer selectively rotates light against the plane polarized background to create cross-polarized images using selective electrical charge imparted to liquid crystal materials in rear LCD display layer. Since polarization of the input polarizer layer is orthogonal to polarization of the output polarizer layer, the cross-polarized image of the scene that is produced by the charged liquid crystal material in the rear LCD display layer is visible to the user with or without the polarized glasses.

The front transmissive LCD panel of the above-described conventional dual-panel display system includes an output polarizer layer adjacent the front LCD display layer positioned between the front LCD display layer and a viewer of the dual panel display system, with no input polarizer layer provided for the front LCD display panel between the front LCD display layer and the rear LCD display panel. Because no input polarizer layer is present for the front LCD display layer, the corresponding perspective view of the scene that is produced by the selectively charged liquid crystal material in the front LCD display layer that is only visible via polarized glasses. At the pixel level, the liquid crystal material may be polarized from any angle from 45 degrees to 135 degrees. Algorithms of the dual-panel display system are used to orient the left eye image at a 45 degree axis for viewing with the left eye polarized lens that is built with a linearly polarized 45 degree axis, and to orient the right eye image at a 135 degree axis for viewing with the right eye polarized lens that is built with a linearly polarized 135 degree axis. Together, the two simultaneously-displayed images produce a perception of a three dimensional scene to the viewer wearing the pair of polarized eye glasses.

Privacy filters for notebook computers and flat panel monitors exist today. These filters are louvered film and are applied to the LCD screen. The louvered film dramatically limits the viewing angle, so that a user has only a few degrees from which to view the content. As a result, the only way to view the contents of the screen is from a position directly in front of it. Thus, the user and people standing behind the user can view the entire content of the screen.

Other technology exists for privacy filtering. In one example, a louver affect is selectively provided, with the result that a brighter screen is provided due to less light being absorbed. In another example, a camera is used to track the eye/head movement of a user in a shaking environment (e.g., when commuting on a train, etc.) and to modify the display screen image so that it shakes in synchronization with the shaking body movement of the user due to the train ride in an attempt to prevent a person sitting directly behind the user from viewing the content of the display screen while in the shaking environment. In both cases, the entire screen is viewed privately only under certain conditions, i.e., at certain angles or under shaking conditions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

Disclosed herein are methods and systems for displaying or projecting images (e.g., text, graphic photographic or artistic images, movies, documents, combinations thereof, etc.) from one or more digital files using an information handling system. The disclosed methods and systems may be implemented in one exemplary embodiment to provide the ability for a user (e.g., mobile business user) of an information handling system to view a selected image (e.g., image that is derived from a data file) on a display or projection screen privately, while allowing other images (e.g., images derived from other data files) to appear on the display or projection screen which are publicly viewable. Advantageously, in such an embodiment only the user is allowed to view the private image, as well as the publicly viewable images. Further advantageously, the private image and publicly viewable images may be optionally simultaneously displayed or projected if so desired. The disclosed methods and systems may be implemented to display or project images on any type of suitable display or projection screen to any type/s of users, but in one exemplary embodiment may be employed to display images to a mobile business user on the liquid crystal display screen of a notebook computer (e.g., small business size notebook computers having a size of from about 12" to about 15.4").

In one exemplary embodiment, the disclosed methods and systems may be implemented using stereoscopic three-dimensional (3D) monitor technology which employs the use of dual LCD panels in a monitor which may be powered, for example, by dual graphical processing units (GPUs) or a common GPU having stereo image data outputs. An optional light diffuser may be positioned between the two display panels. A single front panel linear polarizer may be located in front of the front display panel between the front panel and the viewing location/s of one or more human viewers, or in an alternative embodiment the single linear polarizer may be located in back of the front display panel between the front display panel and the rear display panel. When operating in two-dimensional (2D) mode, the rear display GPU (or rear display output of a stereo GPU) may be selected and controlled to send image data to the rear LCD panel which displays an image that includes content (e.g., content designated as "publicly viewable") that is visible without further polarization to all viewers (e.g., visible to the naked eye without polarized glasses or other polarizing medium). The front display GPU (or front display output of a stereo GPU) may be selected and controlled to send image data to the front LCD panel which displays an image that includes content (e.g., content designated as "privately viewable") that is only visible by human viewers with additional appropriate polarization medium that is correctly matched to the polarizer located, depending on the particular embodiment, either in front of the front panel of the monitor or in back of the front panel of the monitor (e.g., by viewers viewing the monitor through a passive polarizer that is cross-polarized relative to the linearly polarized axis selected for use as the single polarizer located either in front or in back of the front display panel). Although the disclosed systems and methods may be so implemented using a stereoscopic three-dimensional (3D) monitor having dual LCD panels, any other configuration of two or more transmissive display layers disposed in relationship to each other such that they are capable of displaying multiple images in the manner as so described elsewhere herein may also be employed.

The disclosed systems and methods may be implemented in one embodiment to provide one or more viewers with the ability to privately view (with appropriate intervening polarization such as glasses with appropriately polarized lenses) one or more selected "private" images from digital files on a display monitor system or projection screen. In one exemplary display monitor embodiment, a stereoscopic 3D LCD monitor or screen configuration may be employed such as described above, as may be any other configuration of at least two transmissive LCD display layers disposed in spaced or other suitable relationship. In another exemplary embodiment, multiple (e.g., two) image projection assemblies (integrated or non-integrated) may be configured and positioned relative to each other and to a projection screen in order to allow projection of multiple images onto a projection surface for front or rear projection viewing. In either case, both the private images, as well as other images selected for public display as images visible to the naked eye, may be simultaneously displayed and coexist simultaneously on the same display monitor system or projection screen. In such a case, content of the private images will be visible only to those one or more users viewing the images with appropriate intervening polarization.

In one exemplary embodiment, by taking advantage of horizontal viewing angle capability of LCD display panel technology (e.g., allowing viewing angles of up to about 170 degrees), the content of private images may be visible from many viewing locations within a given viewing area in front of the display screen system, e.g., allowing many individuals to stand in a semicircle around the front of the display screen and view the private content of the private image in a manner not possible when using conventional louvered privacy filters.

In another exemplary embodiment, a software and/or firmware application may be further provided for execution on an information handling system that uses one or more characteristics of a given digital file to selectably display images either publicly (visible to all viewers) or privately (only visible to viewers with correct intervening polarization medium present). Examples of file characteristics that may be so used include, but are not limited to, file attribute/s assigned to a given file, file type (e.g., text file, graphic image file, html file, etc.). Using this capability, images from any arbitrary file may be selected to be viewed privately from at least one viewing location using appropriate polarization by having that selected file or files displayed on a front display panel of a dual display panel system or other suitable multiple-display layer configuration as described elsewhere herein. Optionally, images from other files may be viewed publicly at the same time from the same viewing location by having the publically-viewable images simultaneously displayed onto the rear display panel of the dual-display panel system.

For example, a software and/or firmware application may be provided for execution on an information handling system (e.g., note book computer) that is capable of assigning a viewability attribute (e.g., publicly viewable, privately viewable) to any digital file that is accessed by the information handling system (e.g., accessed from system storage such as optical or magnetic disk drive or non-volatile memory, accessed or downloaded from Internet or other network, etc.). A software and/or firmware application may be further provided for execution on an information handling system that uses this attribute to selectably display images either publicly (visible to all viewers) or privately (only visible to viewers with correct intervening polarization medium present). When implemented to display images on a dual LCD panel monitor such as described above, a "private" attribute setting may be implemented to ensure that image/s from a particular digital file designated with the "private" attribute is displayed only on the LCD display layer of the front LCD panel via an appropriate GPU output signal from the information handling system to the front panel, whereas the "public" attribute setting may be implemented to ensure that images from a particular digital file designated with the "public" attribute is displayed on the LCD display layer of the rear LCD panel via an appropriate GPU output signal from the information handling system. Similar methodology may be selectable public or private display based on file characteristics other than assigned file attributes (e.g., file type).

In one exemplary embodiment, an image display application (e.g., software and/or firmware utility) may be provided for execution by one or more processors of an information handling system. The image display application may be configured to allow a user of the information handling system to customize what the user wants to view privately by allowing the user to select a given digital file/s (e.g., by keyboard, graphical user interface, other suitable input/output device, etc.) that is accessible to the information handling system, and to allow the user to assign a "privacy" attribute to the selected digital file/s. For example, a default image file privacy attribute may be set to be "public viewable" so that all files are displayed on the rear display panel of a dual display panel system absent user designation otherwise. In such an example, a user may be allowed to selectively assign a "view privately" attribute for one or more selected files, e.g., so that these files will only be displayed privately on the front display panel of a dual display panel system. Alternatively, the default image privacy attributed may be "view privately" in which case a user may be allowed to selectively assign a "public viewable" attribute for one or more selected files to allow public display.

In yet another example, any other type/s of file characteristics (i.e., other than selected file attribute) may be employed by a software to differentiate between privately viewable and public viewable files. Examples of such file characteristics are generic type of image file (e.g., text image file, photographic image file, etc.) and specific types of files (e.g., Microsoft Word document file, JPEG image file, MPEG video image file, HTML file, etc.), file name assigned by a user, etc. In the latter example, an information handling system may be configured to display images having a particular file characteristic either privately or publicly by default (e.g., all text image files displayed privately and all video image files displayed publicly), based on desired system configuration and/or based on user selection of same via input to an image display application.

In another example, an image display application may be configured to give a user the ability to highlight/select a file of interest to view privately, and then to perform a HotKey stroke or keystroke combination (e.g., Cntl+key or Alt+key) to confirm this selection to the information handling system. In a further embodiment, a user may be given the ability to instantly (i.e., in real time) change the privacy attribute of a given image file, e.g. "panic button" function. For example, a user may be enabled to change a public viewable file to a view privately file, e.g., with a stroke of a designated keyboard key or other button. In one exemplary embodiment, a user-programmable Hot Key or a Pre-Programmed Hot Key may be provided for this panic button purpose on a keyboard of an information handling system.

In one respect, disclosed herein is a method of displaying images, including: providing at least first and second display layers, the first display layer being disposed in relationship to the second display layer in a position between the second display layer and at least one location for viewing images displayed by the first and second display layers, and the first display layer being transmissive to images displayed by the second display layer; providing an information handling system coupled to each of the first and second display layers, the information handling system including at least one processor configured to process an image file and to selectably display an image from the image file on either of one of the first or second display layers; processing a first image file with the information handling system for display of a first image from the image file; and selectably displaying the first image from the first image file on the second display layer or only on the first display layer based on at least one of a file characteristic of the first image file, a user input, or a combination thereof. In one embodiment, an image displayed on the second display layer may be visible at the at least one viewing location without further polarization after it passes through the first display layer, and an image displayed on the first display layer may include one or more portions of light that are polarized relative to background light displayed on the first display layer such that the image is only visible at the at least one viewing location when it is cross polarized relative to the polarization of the one or more portions of light.

In another respect, disclosed herein is a method of displaying images, including: providing at least first and second display layers, the first display layer being disposed in spaced relationship to the second display layer in a position between the second display layer and at least one location for viewing images displayed by the first and second display layers, and the first display layer being transmissive to images displayed by the second display layer; and displaying an image on at least one of the first or second display layers. In one embodiment, an image displayed on the second display layer may be visible at the at least one viewing location without further polarization after it passes through the first display layer and the first polarizing layer, and an image displayed on the first display layer may include one or more portions of light that are polarized relative to background light displayed on the first display layer such that the image is only visible at the at least one viewing location when it is cross polarized relative to the polarization of the one or more portions of light.

In another respect, disclosed herein is an information handling system configured for coupling to a display system or a projection system, the information handling system including at least one processor configured to process a first image file, the at least one processor being configured to selectably provide image data from the first image file for either of: display on a second display layer of the display system or for projection by a second projection assembly of the projection system, or only for display on a first display layer of the display system or only for projection by a first projection assembly of the projection system. The information handling system may further include an image display application configured to execute on the at least one processor and to select the first image based on identification of the file characteristic of the image file, the user input, or a combination thereof as either of: a publicly viewable file for display on the second display layer or for projection on the second projection assembly, or a privately viewable file for display only on the first display layer or for projection on the first projection assembly.

DESCRIPTION OF ILLUSTRATIVE EMBODIMENTS

Figure 1A:
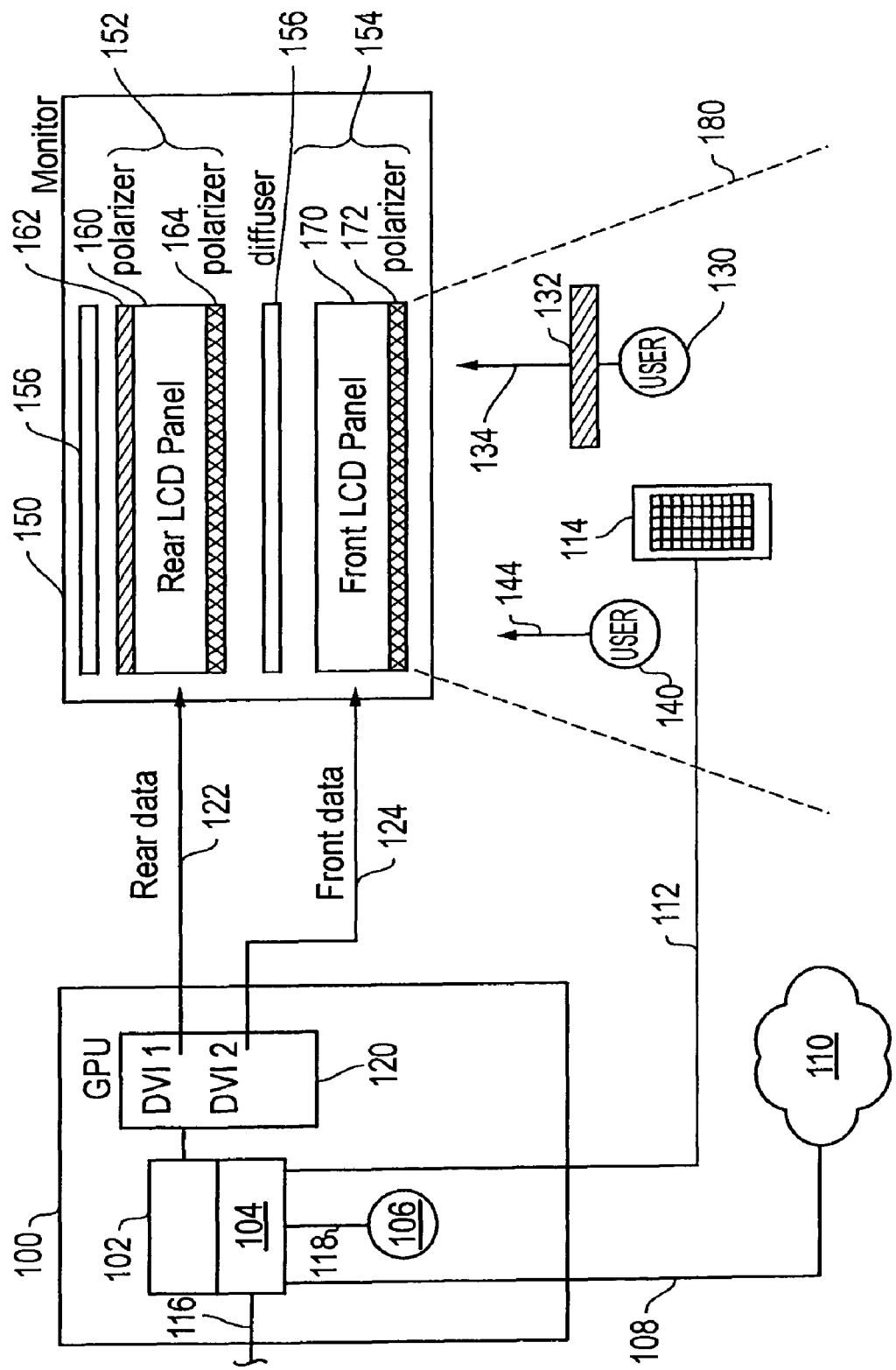
FIG. 1A is a simplified block diagram showing an information handling system coupled to a dual panel display system according to one exemplary embodiment of the disclosed methods and systems.

FIG. 1A shows an information handling system 100 as it may be coupled to provide image data for display on a dual panel display system 150 according to one exemplary embodiment of the disclosed systems and methods. Information handling system 100 may be a desktop computer, a portable information handling system such as notebook computer, or may be of any other suitable configuration for providing image data to dual display system 150 in a manner as described elsewhere herein. In the illustrated embodiment, information handling system 100 includes a one or more processors 104 that include a central processing unit (CPU). An image display software and/or firmware application 102 that is executing on processor/s 104 may be provided as shown to implement one or more features of image display methodology described further herein.

Information handling system 100 also includes internal memory 106 (e.g., magnetic or optical disk drive), and GPU 120 having dual image display capability (e.g., via stereo graphics device drivers and two digital video interfaces, DVI 1 and DVI 2), it being understood that two separate single image GPUs may alternatively be employed for this purpose. In one exemplary embodiment, GPU 120 may be a implemented using commercially available stereo graphics device drivers such as are available from NVIDIA Corporation of Santa Clara, Calif. Such stereo graphics device drivers allow a single GPU card to output a left and a right channel data stream out of a GPU 120 using two connectors (i.e. 2 DVI connectors, etc). Such device drivers may be further modified to convert from left and right channels into front and rear channels in order to support a front and rear LCD panel architecture of a dual display monitor such as iZ3D stereoscopic display monitor available from Neurok Optics of San Diego, Calif.

In the illustrated embodiment, image display application 102 of processor/s 104 is shown coupled to receive and process digital file information in the form of digital data 118 from memory 106, digital data 108 from network 110 (e.g., wide area network such as Internet, local area network, etc.), and/or digital data 116 from other source such as an external memory device, it being understood that these are components are exemplary only and that a processor of an information handling system may be configured to receive digital data from any one or more sources capable of supplying digital data. Image display application 102 is also shown coupled to receive user command signals 112 from an input/output device, in this case a keyboard device 114. Image display application 102 is in turn coupled as shown to provide data to GPU 120, which provides image data 122 and 124 for display by dual panel display system 150 in a manner as described elsewhere herein. Once again, it will be understood that the particular configuration and combination of components of information handling system 100 are exemplary only, and that any other information handling system configuration may be employed that is suitable for displaying images on a dual panel display system in a manner as described elsewhere herein.

Still referring to FIG. 1A, dual panel display system 150 includes a first or front LCD display panel 154 and a second or rear LCD display panel 152 disposed in spaced relationship and substantially optically aligned with each other so that an image produced by rear LCD display panel 152 passes through front LCD display panel 154, which is transmissive to light produced by rear LCD display panel 152. As shown, in one exemplary embodiment, each of LCD display panels 154 and 152 may be transmissive liquid crystal LCD display panels with a back (e.g., white) light 156 positioned behind rear LCD display panel 152. An optional diffuser 156 may be present between rear LCD panel 152 and front LCD panel 154, although this is not necessary. Further information on display panels for commercially-available dual LCD panel display system technology may be found described in U.S. Pat. Nos. 6,985,290; 6,717,728; United States Patent Application Publication 2005/0146787; and United States Patent Application Publication 2003/0122828, each of which is incorporated herein by reference.

As shown in FIG. 1A, rear LCD display panel 152 includes a LCD display layer 160, an input polarizer layer 162 adjacent LCD display layer 160 between back light 156 and LCD display layer 160, and an output polarizer layer 164 adjacent LCD display layer 160 and between LCD display layer 160 and front LCD panel 154 (with optional diffuser 156 therebetween in this embodiment). Input polarizer layer 162 creates a plane polarized background and LCD display layer 160 selectively rotates light against the plane polarized background to create cross-polarized images (e.g., text, graphics, etc.) using selective electrical charge imparted to liquid crystal materials in LCD display layer 160 based on image data 122 sent to LCD display layer 160 by GPU 120. Polarization of input polarizer layer 162 is substantially orthogonal to polarization of output polarizer layer 164 such that a cross-polarized image produced by the charged liquid crystal material in LCD display layer 160 is visible to the naked eye with no further polarization after transmittal through output polarizer layer 164. Thus, because two polarizing layers are present in rear LCD display panel 152, images from all files sent to this panel by GPU 120 are visible to the naked eye at any viewing location within viewing area 180 of dual panel display system 150. It will be understood that in one embodiment, components of rear LCD panel display 152 may be configured and operate in the same manner as a display panel of a commercially available dual panel LCD display system, such as described in United States Patent Application Publication 2005/0146787.

As further shown in FIG. 1A, configuration of front LCD panel 154 differs from the configuration of rear LCD panel 152 in that front LCD panel 154 includes only an output polarizer layer 172 adjacent LCD display layer 170 between LCD display layer 170 and a viewing area 180 of dual panel display system 150, i.e., there is no input polarizer layer provided for LCD display panel 152. Because no input polarizer layer is present for LCD display layer 170, any image that is produced by selectively charged liquid crystal material in LCD display layer 170 (based on image data 124 sent to LCD display layer 170 by GPU 120) is not visible to the naked eye after transmittal through output polarizer layer 172 without the missing polarization normally provided by an input polarizer for LCD display layer 170, or without further polarization that is orthogonal (or cross-polarized) relative to the polarization imparted by output polarizer layer 172. In one exemplary embodiment, components of front LCD panel display 154 may be configured similar to a front display panel of a commercially-available stereoscopic LCD display panel system (e.g., such as described in United States Patent Application Publication 2005/0146787) but with the input polarizer layer missing from the display panel. One example of a suitable commercially-available stereoscopic dual panel LCD display system configured with the input polarizer layer missing from the front display panel is known as an iZ3D stereoscopic display monitor available from Neurok Optics of San Diego, Calif.

Still referring to FIG. 1A, a first human user 140 may be positioned as shown at a first given viewing location within viewing area 180 of dual panel display system 150, and having a line of sight 144. A second human user 130 may be positioned as shown at a second given viewing location within viewing area 180 and having a line of sight 134. In this exemplary embodiment, a light transmissive polarizer medium 132 (e.g., transmissive passive polarizing eyeglasses, transmissive passive light polarizing screen or other suitable optically transmissive polarizing medium) is shown positioned in line of sight 134 between user 130 and dual panel display system 150. In this embodiment, polarizer medium 132 is selected to be cross-polarized relative to output polarizer layer 172 of front LCD panel 154, so that images produced by selectively charged liquid crystal material in LCD display layer 170 of front LCD panel 154 are created, but not visible, against background light without cross polarizing medium 132. Therefore, images produced by front LCD panel 154 are visible to user 130 (i.e., after passing through polarizing medium 132), and not visible to user 140 (e.g., private images). However, images produced by rear LCD panel 152 are visible to both users 130 and 140 (e.g., as publicly viewable images).

Figure 1B:
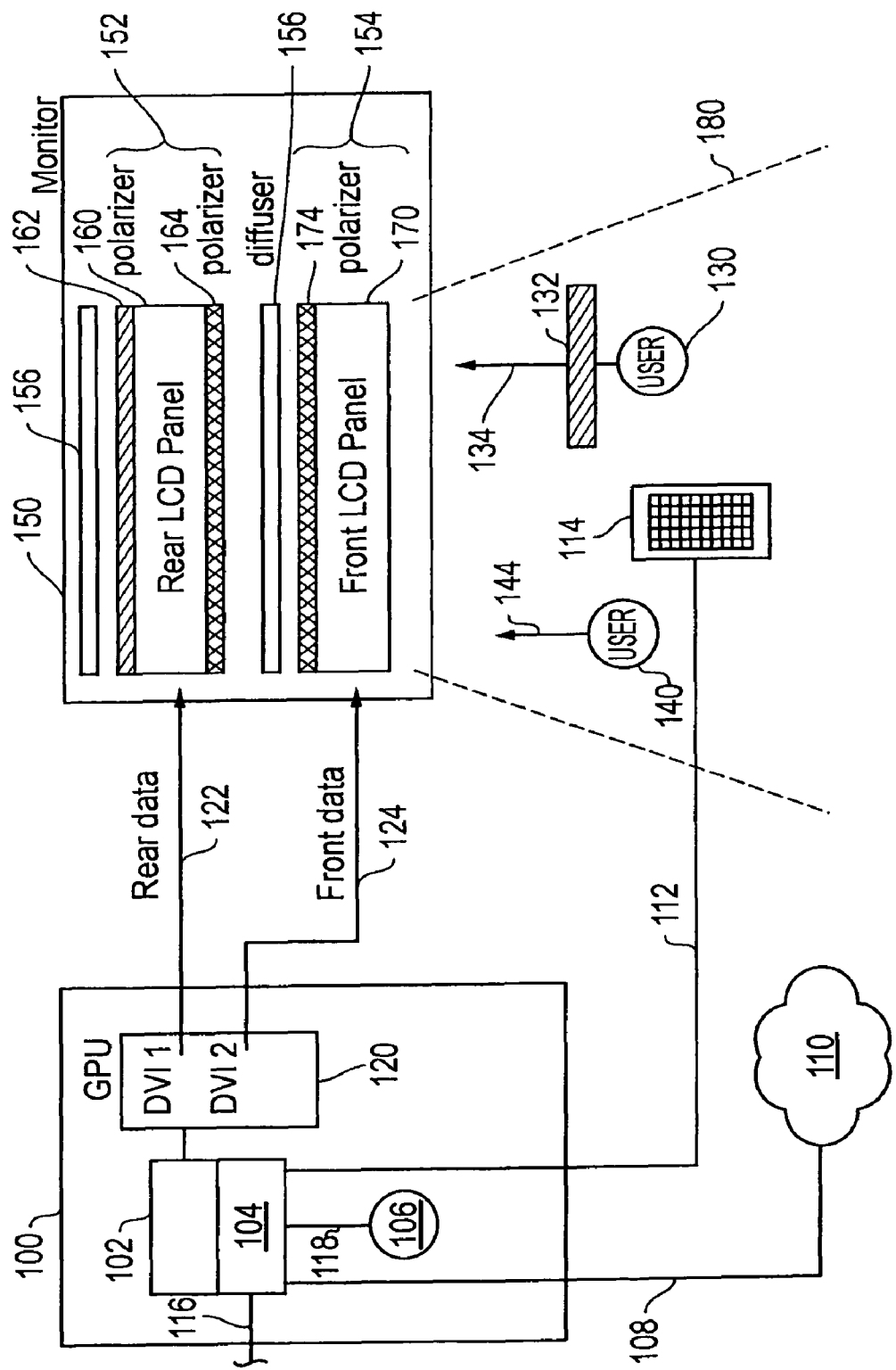
FIG. 1B is a simplified block diagram showing an information handling system coupled to a dual panel display system according to one exemplary embodiment of the disclosed methods and systems.

For example, FIG. 1B, illustrates an alternate embodiment of dual panel display system 150 that includes a first or front transmissive LCD display panel 154 and a second or rear transmissive LCD display panel 152 disposed in spaced relationship and substantially optically aligned with each other in a manner as previously described. However, in this exemplary embodiment, configuration of front LCD panel 154 differs from the configuration of rear LCD panel 152 in that front LCD panel 154 includes only an input polarizer layer 174 adjacent LCD display layer 170 between LCD display layer 170 and optional diffuser 156, i.e., there is no output polarizer layer provided in this exemplary embodiment for LCD display panel 152. Optional diffuser 156 may be present in this embodiment, for example, to rotate output light from rear display panel 152 to match input light orientation of input polarizer layer 174 of front LCD panel 154 or may be absent where output light from rear display panel 152 already matches input light orientation of input polarizer layer 174 of front LCD panel 154. Because no output polarizer layer is present for LCD display layer 170, any image that is produced by selectively charged liquid crystal material in LCD display layer 170 (based on image data 124 sent to LCD display layer 170 by GPU 120) is not visible to the naked eye after without the missing polarization normally provided by an output polarizer for LCD display layer 170, or without further polarization that is orthogonal (or cross-polarized) relative to the polarization imparted by input polarizer layer 172.

Still referring to FIG. 1B, a first human user 140 may be positioned as shown at a first given viewing location within viewing area 180 of dual panel display system 150, and having a line of sight 144. A second human user 130 may be positioned as shown at a second given viewing location within viewing area 180 and having a line of sight 134. In this exemplary embodiment, a light transmissive polarizer medium 132 (e.g., transmissive passive polarizing eyeglasses, transmissive passive light polarizing screen or other suitable optically transmissive polarizing medium) is shown positioned in line of sight 134 between user 130 and dual panel display system 150. In this embodiment, polarizer medium 132 is selected to be cross-polarized relative to input polarizer layer 174 of front LCD panel 154 and LCD display layer 170 naturally rotates light (in its non-energized or non-image producing state) by 90 degrees, so that images produced by selectively charged liquid crystal material in LCD display layer 170 of front LCD panel 154 are created, but not visible, against background light without a cross-polarizing medium 132. Therefore, images produced by front LCD panel 154 are visible to user 130 (i.e., after passing through cross-polarizing medium 132), and not visible to user 140 (e.g., private images). However, images produced by rear LCD panel 152 are visible to both users 130 and 140 (e.g., as publicly viewable images).

It will be understood that the embodiments of FIGS. 1A and 1B are exemplary only, and that a dual panel display system may be provided in alternative configurations. For example, a dual panel display system may be provided with any alternative configuration of optics suitable for producing plane polarized light for illumination of a rear LCD display panel and a front LCD display panel in the manner described herein. Furthermore, any other configuration of multiple displays may be employed that is suitable for producing publically and privately viewable images in a manner as described elsewhere herein.

Although the disclosed systems and methods may be implemented as described above for FIGS. 1A and 1B using liquid crystal material in LCD display layer 170 that in its relaxed (non-image producing) state naturally rotates light by 90 degrees with a corresponding cross-polarizing medium 132, it is also possible to employ liquid crystal material that is capable of rotating light by other values, and/or that is capable of selectively rotating light by any one of multiple angles (e.g., at any angle from about 45 degrees to about 135 degrees). It will be understood that a cross polarizing medium 132 may be accordingly selected in such a case based on the selected amount of this variable rotation so that images produced by front LCD panel 154 are visible to user 130 (i.e., after passing through polarizing medium 132), and not visible to user 140 (e.g., private images). Further in yet another alternative embodiment, multiple users 130 may be each provided with a different cross polarizing medium 132 that rotates light by an amount that is tuned to a different selected value of rotation. In such a case, a first private image may be displayed using LCD display layer 170 to rotate light by a first selected rotation amount that is tuned to the polarization characteristics of a first cross polarizing medium 132 used by a first user 130 so that the image is visible to the first user 130 but not to a second user 130 or user 140, and a second private image may be displayed using LCD display layer 170 to rotate light by a second selected rotation amount that is tuned to the polarization characteristics of a second cross polarizing medium 132 used by a second user 130 so that the image is visible to the second user 130 but not to the first user 130 or user 140.

Figure 2:
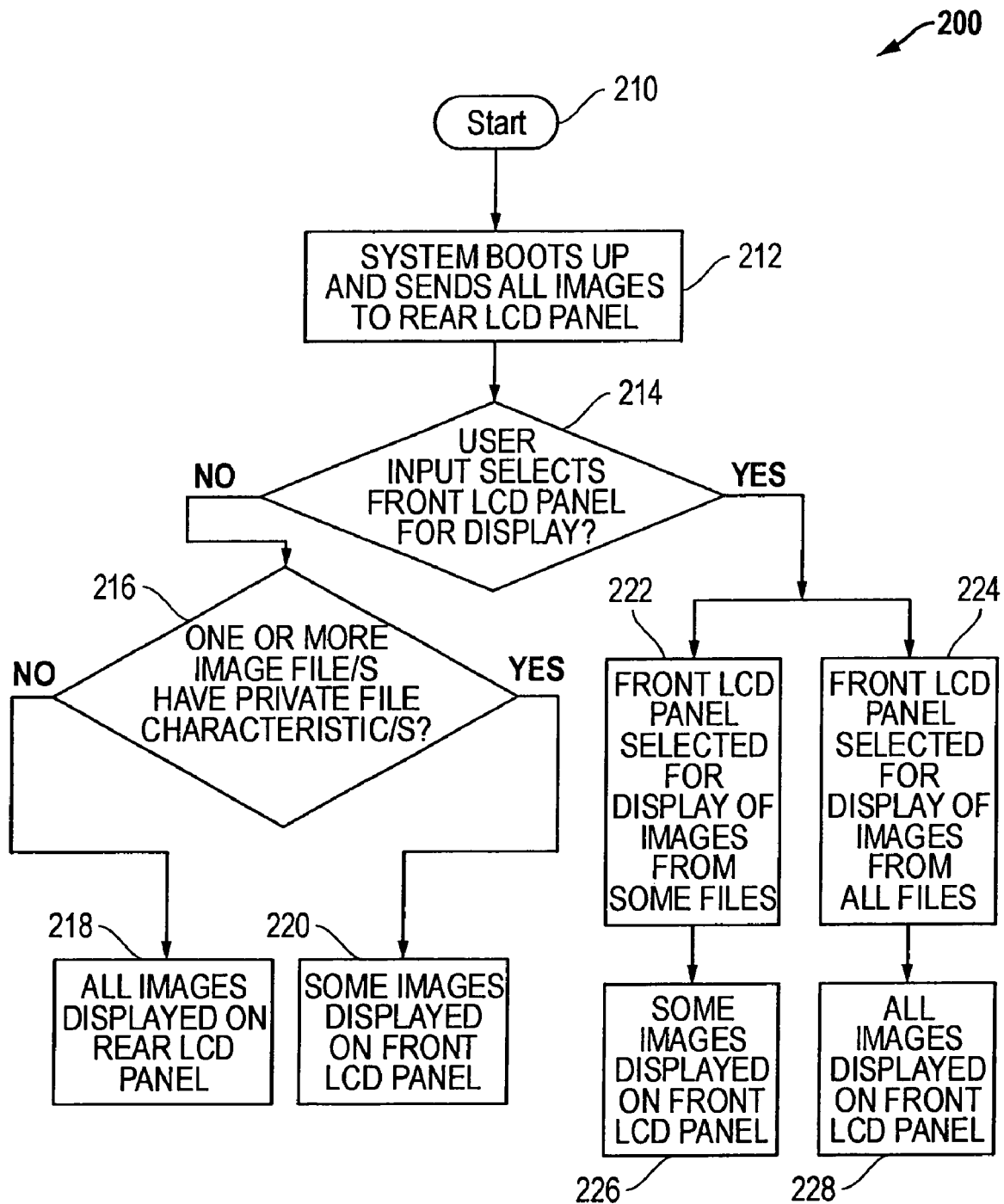
FIG. 2 shows methodology for displaying images on a dual panel display system according to one exemplary embodiment of the disclosed methods and systems.

FIG. 2 shows methodology 200 for displaying images on a dual panel display system using an information handling system according to one exemplary embodiment of the disclosed methods and systems. In this regard, methodology 200 may be implemented as a software and/or firmware application executing on one or more processors of an information handling system, e.g., as application 102 of either FIG. 1A or 1B. Thus, the following description of methodology 200 refers to implementation using dual panel display system 150 and information handling system 100 of FIG. 1A or 1B, however, it will be understood that the methodology of FIG. 2 may be implemented with other combinations of display and information handling system hardware and/or other components.

Methodology 200 starts at step 210 and proceeds to step 212 where system 100 boots-up and image display application 102 initially sends all data content (i.e. Windows Desktop and icons, etc.) by default to rear LCD panel 152. In this display mode all images are visible to the naked eye without further polarization to any user/s in viewing area 180. However, it will be understood that it is also possible that image display application 102 may be alternately configured to send all data content to front LCD panel 154 so that all images are only visible by user 130 with benefit of polarizer medium 132. Those display modes where all images are sent to only one LCD panel may also be referred to as two-dimensional (2D) display modes.

Next, image display application 102 determines in step 214 if user 130 has selected front LCD panel 154 for display of image data. User 130 may select front LCD panel 154 for display of image data using any suitable I/O device or methodology (e.g., using a button on the dual panel display system, keyboard 114, icon setting, or other suitable I/O device). When a user so selects front LCD panel 154 for display of image data, methodology 200 proceeds to either step 222 (i.e., when user selects front LCD panel 154 for display of image data from some files) or to step 224 (i.e., when user selects front LCD panel 154 for display of image data from all files). Image display application 102 responds accordingly, i.e., by displaying some images on front LCD panel 154 in step 226 (while displaying other images on rear LCD panel 152), or by displaying all image on front LCD panel 154 in step 228. In either case, all images displayed on front LCD panel 154 are only visible by user 130 with benefit of polarizer medium 132, while any images simultaneously displayed on rear LCD panel 152 are visible to both users 130 and 140.

In one exemplary embodiment, image display application 102 may simultaneously send some image data to rear LCD display panel 152 and some image data to front LCD panel 154 to implement a three dimensional (3D) display mode for displaying 3D content from a single common image file (i.e., 3D video game, 3D movie, etc.) from a selected source. In such a case, for example, a device driver of GPU 120, enabled in stereo mode, distributes the 3D content between the 2 stereo channels 122 and 124 to the two respective LCD panels 152 and 154. In such a case, user 130 (with benefit of polarizer medium 132) is able to see the content from both panels 152 and 154, thus experiencing the desired 3D effect of the 3D file content. In a further embodiment, image display application 102 may be optionally configured to automatically recognize a 3D image file (i.e., 3D video game, 3D movie, etc.) and to automatically display this type of file in 3D display mode without user instruction or request.

Returning to FIG. 2, if a user has not selected front LCD panel 154 for display in step 214, then image application 102 may be configured to select between LCD panel 152 or 154 for display of an image from a given image file based on one or more file characteristics of the image file. Examples of such file characteristics include, but are not limited to, file attribute/s assigned to a given file, file type (e.g., text file, graphic image file, html file, etc.). In one exemplary embodiment, the default viewing setting for an image from any given image file is a "Public Viewable" setting, i.e., the same display setting used in step 212. Using this setting, the image data from the file is sent to the rear LCD panel display 152 in step 218, e.g., via the rear data port (stereo driver mode enabled) from the GPU 120. However, if one or more file characteristics of a given image file indicate a "View Privately" setting selected for the image file, then the image data from the file is sent only to the front display panel 154 in step 220, e.g., via the front data port from the GPU 120.

It will be understood that methodology 200 of FIG. 2 is exemplary only and that the steps may be performed in other embodiments in different order, and/or with lesser or additional steps. Further, the steps of methodology 200 may be configured to repeat in iterative manner, e.g., by returning to step 214 each time one of steps 218, 220, 226 or 228 is reached. In addition, a user may be enabled to modify file characteristics and/or default public/private viewing preferences at any time during operation of methodology 200.

Thus, using the disclosed methods and systems only a user 130 employing an appropriate polarizer medium 132 (e.g., wearing special polarizer glasses) positioned in the user's line of sight 134 and that is tuned to be cross-polarized to the output polarizer layer 172 of front LCD panel 154 of FIG. 1A or that is tuned to be cross-polarized to the input polarizer layer 174 of front LCD panel 154 of FIG. 1B, is able to view the particular selected "privately viewable" file/content. A given user 140 (having no benefit of a polarizer medium in the user's line of sight 144) will not be able to see the private viewable content that has been sent to the front LCD panel 154. This allows multiple users 130 to view the selected private content, limited only by the availability of appropriate polarizer medium (e.g., the number of available glasses) for the users and the viewing angle that defines the viewing area 180 of dual panel display system 150. Other users 140 (without benefit of appropriate polarizer medium) in the viewing area of dual panel display system 150 are enabled to see all other publicly viewable content on the monitor (i.e., Word documents, Web Browsers, pictures, etc.), except for the particular selected private viewable content.

In one exemplary embodiment, a user 130 may be allowed to select images from multiple files to view privately on dual panel display system 150, while also displaying multiple files that other users 140 may publicly view on the same dual panel display system 150. User 130 may make this selection dynamically and in real time (e.g., via steps 214 and 222 of FIG. 2), or may be allowed to pre-select the identity (e.g., file name and/or file attributes) of specific files and/or file types (e.g., Word document type) for automatic private display (e.g., via steps 216, 218 and 220). In one example, a user may be allowed to pre-set file attributes of particular individual files for private display (with all other files being publicly viewable by default), or may be enabled to select that images from all files of a specific type (e.g., word documents) be privately displayed.

Figure 3A:
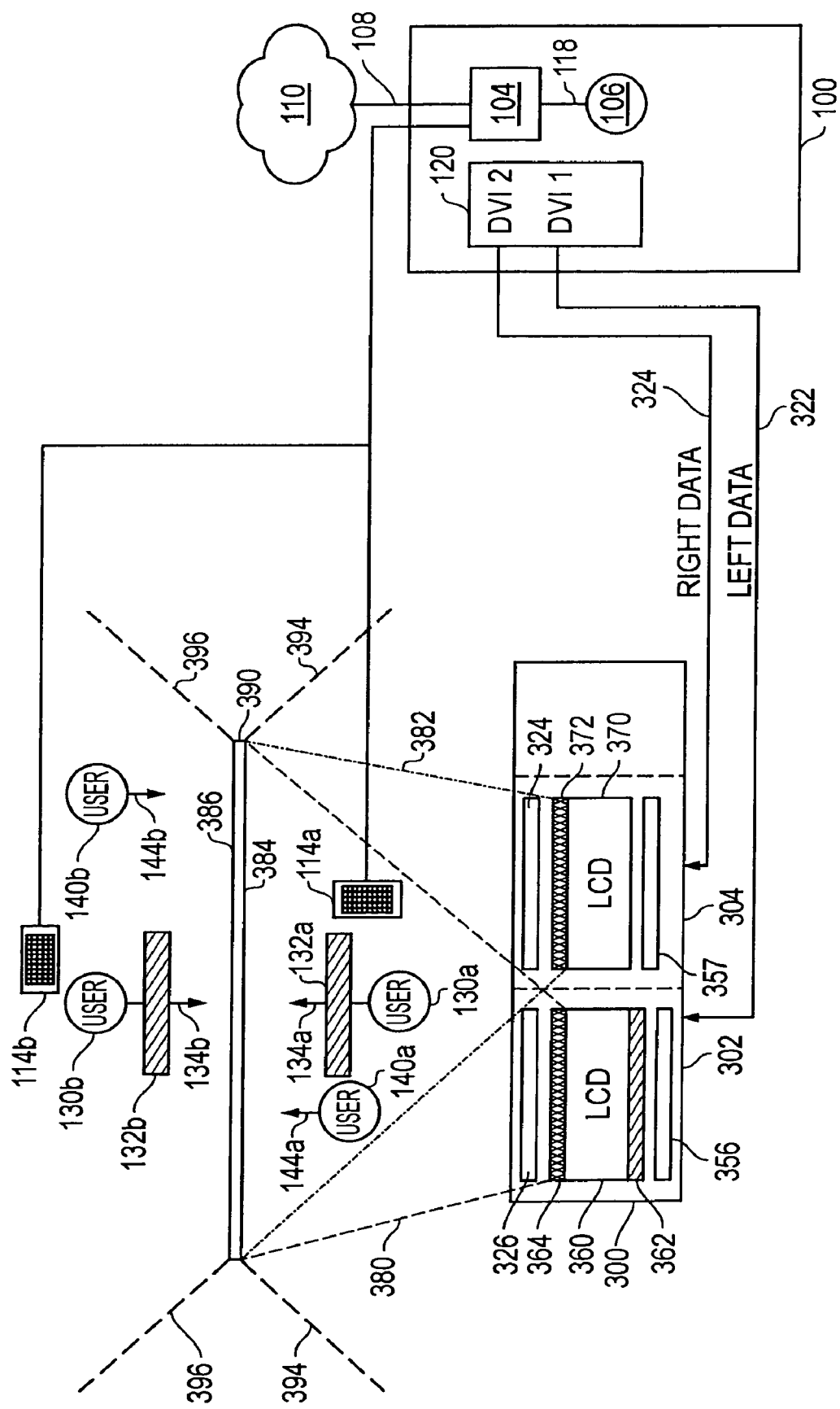
FIG. 3A is a simplified block diagram showing an information handling system coupled to a dual image projection system according to one exemplary embodiment of the disclosed methods and systems.

FIG. 3A illustrates one exemplary embodiment of the disclosed systems and methods in which a dual image projection system 300 may be coupled to receive separate image data 322 and image data 324 from an information handling system 100, although separate image data may be received from any other suitable type of image data source/s. In this exemplary embodiment, dual image projection system 300 may be configured to in turn project separate image beams 380 and 382 that correspond to image data 322 and 324, respectively. In this regard, image beams 380 and 382 may be projected onto a projection screen 390 in a manner such that the image corresponding to image beam 380 (and corresponding to image data 322) substantially completely overlaps with the image corresponding to image beam 382 (and corresponding to image data 324), although it will be understood that image beams 380 and 382 may be projected onto projection screen 390 in other manners, e.g., such that the image corresponding to image beam 380 at least partially overlaps with the image corresponding to image beam 382. As shown in FIG. 3A, projection screen 390 may be a front projection screen that is configured for viewing by users 130*a* and 140*a*, and/or may be configured as a rear projection screen (e.g., that is transmissive to the projected image) that is configured for viewing by users 130*b* and 140*b* from the rear side 386 of the projection screen 309 as shown. It will be understood that the orientation of the images projected by dual image projection system 300 may be inverted or reversed prior to projection so that the images appear correctly oriented to a user 130*b* from the rear side 386 of the projection screen 390.

Although FIG. 3A illustrates both front and rear side projection of images on projection screen 390, it will be understood that dual image projection system 300 and projection screen 390 may be configured only for front projection of images (e.g., to users 130*a* and 140*a*), or only for rear projection of images (e.g., to users 130*b* and 140*b*). Further, it will be understood that image projection system 300 may be configured for front projection of images onto any suitable front and/or rear projection surface (e.g., office wall surface, pull down projection screen, movie theater screen, etc.), or may be configured for rear projection of images onto any suitable transmissive viewing surface (e.g., rear projection television screen or computer monitor screen, rear projection movie screen or other type of rear projection display screen, etc.).

Still referring to the exemplary embodiment of FIG. 3A, dual image projection system 300 includes a first or left projection assembly 302 that generates and projects first image beam 380 onto projection screen 390, and a second or right projection assembly 304 that generates and projects second image beam 382 onto projection screen 390. Although the exemplary embodiment of FIG. 3A employs a dual image projection system 300 that includes integrated multiple projection assemblies 302 and 304, it will be understood that any other system configuration may be employed that is suitable for generating and projecting multiple images onto a projection screen in a manner as described herein. For example, two independent and separate (i.e., non-integrated) projection systems may be employed in place of integrated projection assemblies 302 and 304 of FIG. 3A.

As shown in FIG. 3A, first projection assembly 302 includes first LCD light modulator 360 that is transmissive to light that is provided by projection light source 356 of first projection assembly 302. An input polarizer layer 362 is positioned adjacent first light modulator 360 between projection light source 356 and first LCD light modulator 360, and an output polarizer layer 364 is positioned adjacent first LCD light modulator 360 and between first LCD light modulator 360 and projection lens 326 of first projection system 302.

In the illustrated embodiment of FIG. 3A, input polarizer layer 362 of first projection assembly 302 creates a plane polarized background and first LCD light modulator 360 selectively rotates light against the plane polarized background to create cross-polarized images (e.g., text, graphics, etc.) using selective electrical charge imparted to liquid crystal materials in first LCD light modulator 360 based on image data 322 that is provided to first projection assembly 302. Polarization of input polarizer layer 362 is substantially orthogonal to polarization of output polarizer layer 364 such that a cross-polarized image produced by the charged liquid crystal material in first LCD light modulator 360 and projected onto projection screen 390 by first projection system 302 is visible to the naked eye with no further polarization after transmittal through output polarizer layer 364. Thus, because two polarizing layers are present in first projection assembly 302, images from all files projected by first projection system 302 are visible to the naked eye at any viewing location within front projection viewing area 394 and/or rear projection viewing area 396 of projection screen 390.

Still referring to FIG. 3A, second projection assembly 304 includes second LCD light modulator 370 that is transmissive to light that is provided by projection light source 357 of second projection assembly 304. As shown, second projection assembly 304 includes only an output polarizer layer 372 adjacent second LCD light modulator 370 between second LCD light modulator 370 and projection lens 324, i.e., there is no input polarizer layer provided for second LCD light modulator 370 of second projection system 304. Because no input polarizer layer is present for second LCD light modulator 370, any image that produced by the charged liquid crystal material in second LCD light modulator 370 and projected onto projection screen 390 by second projection system 304 (based on image data 324 provided to second LCD light modulator 370) is not visible to the naked eye after transmittal through output polarizer layer 372 without the missing polarization normally provided by an input polarizer for second LCD light modulator 370, or without further polarization that is orthogonal (or cross-polarized) relative to the polarization imparted by output polarizer layer 372 of second projection system 304.

Still referring to FIG. 3A, a first human user 140*a* may be positioned as shown at a first given viewing location within front projection viewing area 394 of projection screen 390, and having a line of sight 144*a*. A second human user 130*a* may be positioned as shown at a second given viewing location within front projection viewing area 394 of projection screen 390, and having a line of sight 134*a*. In this exemplary embodiment, a light transmissive polarizer medium 132*a* (e.g., transmissive passive polarizing eyeglasses, transmissive passive light polarizing screen or other suitable optically transmissive polarizing medium) is shown positioned in line of sight 134*a* between user 130*a* and front side 384 of projection screen 390.

In the embodiment of FIG. 3A, polarizer medium 132*a* is selected to be cross-polarized relative to output polarizer layer 372 of second projection assembly 304, so that images produced by selectively charged liquid crystal material in second LCD light modulator 370 of second projection assembly 304 are projected onto front side 384 of projection screen 390, but riot visible, without cross polarizing medium 132*a*. Therefore, images projected by second projection assembly 304 are visible to user 130*a* (i.e., after passing through polarizing medium 132*a*), and not visible to user 140*a* (e.g., private images). However, images projected by first projection assembly 302 onto front side 384 of projection screen 309 are visible to both users 130*a* and 140*a* (e.g., as publicly viewable images).

In a similar manner, when projection screen 390 of FIG. 3A is configured as a rear projection screen, first human user 140*b* may be positioned as shown at a first given viewing location within rear projection viewing area 396 of projection screen 390, and having a line of sight 144*b*. A second human user 130*b* may be positioned as shown at a second given viewing location within rear projection viewing area 396 of projection screen 390, and having a line of sight 134*b*. A light transmissive polarizer medium 132*b* (e.g., transmissive passive polarizing eyeglasses, transmissive passive light polarizing screen or other suitable optically transmissive polarizing medium) may be positioned as shown in line of sight 134*b* between user 130*b* and rear side 386 of projection screen 390.

In such a rear projection embodiment, images projected by second projection assembly 304 on the rear side 386 of projection screen 390 are visible to user 130b (i.e., after passing through polarizing medium 132b), and not visible to user 140b (e.g., private images). However, images projected by first projection assembly 302 on the rear side of projection screen 309 are visible to both users 130b and 140b (e.g., as publicly viewable images).

Figure 3B:
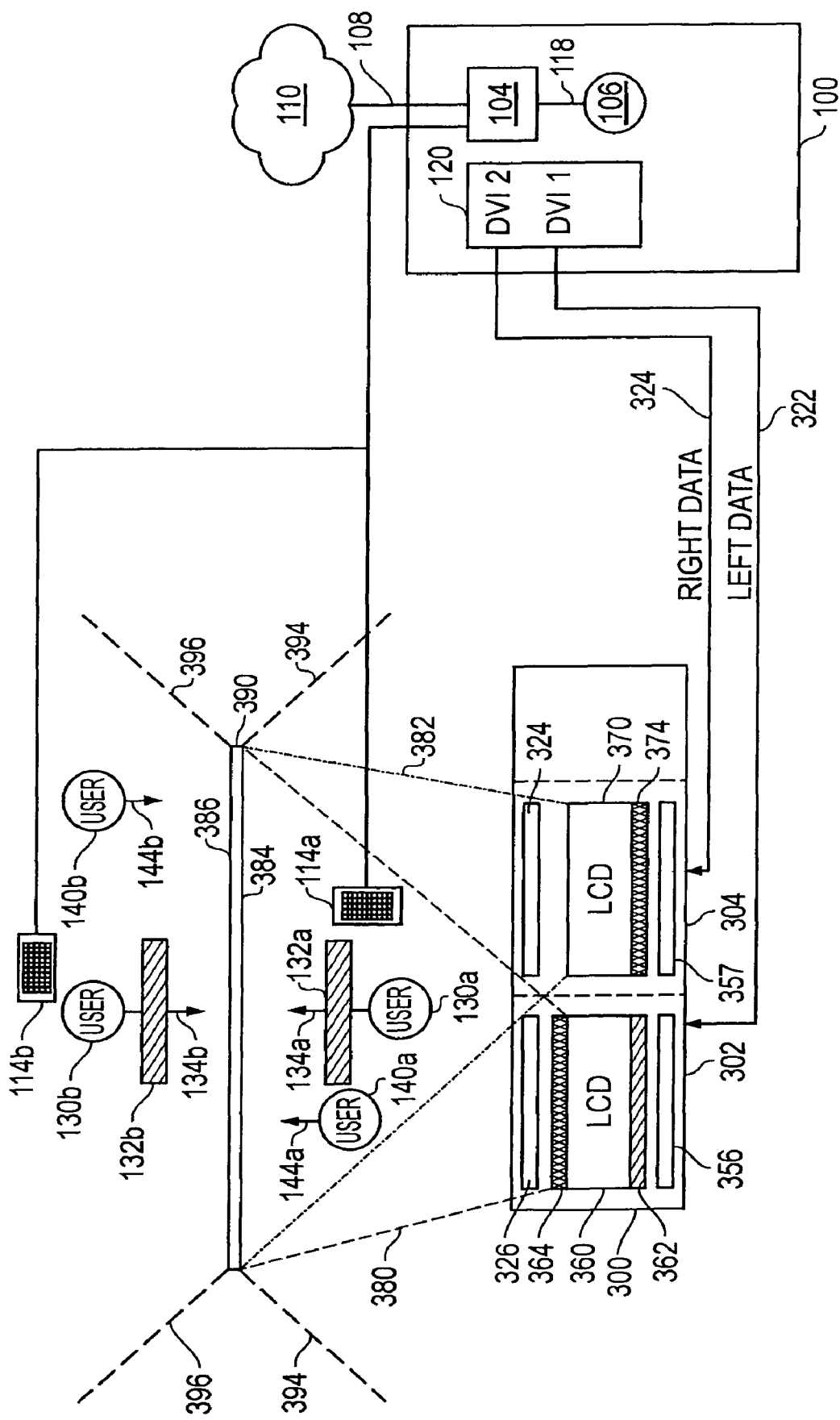
FIG. 3B is a simplified block diagram showing an information handling system coupled to a dual image projection system according to one exemplary embodiment of the disclosed methods and systems.

FIG. 3B illustrates an alternative embodiment of the disclosed systems and methods in which a dual image projection system 300 may be coupled as previously described for FIG. 3A to receive separate image data 322 and image data 324 from an information handling system 100, and to project separate image beams 380 and 382 that correspond to image data 322 and 324, respectively and in a manner as described before. In the exemplary embodiment of FIG. 3B, first projection assembly 302 is configured in the same manner as shown and described in FIG. 3A. However, second projection assembly 304 includes only an input polarizer layer 374 adjacent second LCD light modulator 370 between second LCD light modulator 370 and projection light source 357, i.e., there is no output polarizer layer provided for second LCD light modulator 370 of second projection system 304. Because no output polarizer layer is present for second LCD light modulator 370, any image that produced by the charged liquid crystal material in second LCD light modulator 370 and projected onto projection screen 390 by second projection system 304 (based on image data 324 provided to second LCD light modulator 370) is not visible to the naked eye without the missing polarization normally provided by an output polarizer for second LCD light modulator 370, or without further polarization that is orthogonal (or cross-polarized) relative to the polarization imparted by input polarizer layer 374 of second projection system 304 of FIG. 3B.

Still referring to FIG. 3B, a first human user 140a may be positioned as shown at a first given viewing location within front projection viewing area 394 of projection screen 390, and having a line of sight 144a. A second human user 130a may be positioned as shown at a second given viewing location within front projection viewing area 394 of projection screen 390, and having a line of sight 134a. In this exemplary embodiment, a light transmissive polarizer medium 132a (e.g., transmissive passive polarizing eyeglasses, transmissive passive light polarizing screen or other suitable optically transmissive polarizing medium) is shown positioned in line of sight 134a between user 130a and front side 384 of projection screen 390.

In the embodiment of FIG. 3B, polarizer medium 132a is selected to be cross-polarized relative to input polarizer layer 374 of second projection assembly 304, so that images produced by selectively charged liquid crystal material in second LCD light modulator 370 of second projection assembly 304 are projected onto front side 384 of projection screen 390, but not visible, without cross polarizing medium 132a. Therefore, images projected by second projection assembly 304 are visible to user 130a (i.e., after passing through polarizing medium 132a), and not visible to user 140a (e.g., private images). However, images projected by first projection assembly 302 onto front side 384 of projection screen 309 are visible to both users 130a and 140a (e.g., as publicly viewable images).

In a similar manner, when projection screen 390 of FIG. 3B is configured as a rear projection screen, first human user 140b may be positioned as shown at a first given viewing location within rear projection viewing area 396 of projection screen 390, and having a line of sight 144b. A second human user 130b may be positioned as shown at a second given viewing location within rear projection viewing area 396 of projection screen 390, and having a line of sight 134b. A light transmissive polarizer medium 132b (e.g., transmissive passive polarizing eyeglasses, transmissive passive light polarizing screen or other suitable optically transmissive polarizing medium) may be positioned as shown in line of sight 134b between user 130b and rear side 386 of projection screen 390. In such a rear projection embodiment, images projected by second projection assembly 304 on the rear side 386 of projection screen 390 are visible to user 130b (i.e., after passing through polarizing medium 132b), and not visible to user 140b (e.g., private images). However, images projected by first projection assembly 302 on the rear side of projection screen 309 are visible to both users 130b and 140b (e.g., as publicly viewable images).

In this embodiment, polarizer medium 132 (132a and/or 132b) is selected to be cross-polarized relative to input polarizer layer 374 of second projection assembly 304 and second LCD light modulator 370 naturally rotates light (in its non-energized or non-image producing state) by 90 degrees, so that images produced by selectively charged liquid crystal material in second LCD light modulator 370 of second projection assembly 304 are created, but not visible, against background light without a cross-polarizing medium 132. Therefore, images produced by second projection assembly 304 are visible to user 130 (130a and/or 130b) (i.e., after passing through cross-polarizing medium 132), and not visible to user 140 (140a or 140b) (e.g., private images). However, images produced by first projection assembly 302 are visible to both users 130 and 140 (e.g., as publicly viewable images).

Although the disclosed systems and methods may be implemented as described above for FIGS. 3A and 3B using liquid crystal material in second LCD light modulator 370 that in its relaxed (non-image producing) state naturally rotates light by 90 degrees, it is also possible to employ liquid crystal material that is capable of rotating light by other values, and/or that is capable of selectively rotating light by any one of multiple angles (e.g., at any angle from about 45 degrees to about 135 degrees). It will be understood that a cross polarizing medium 132 may be accordingly selected in such a case based on the selected amount of this variable rotation so that images produced by f second projection assembly 304 are visible to a user 130 (i.e., after passing through polarizing medium 132), and not visible to a user 140 (e.g., private images). Further in yet another alternative embodiment, multiple users 130 may be each provided with a different cross polarizing medium 132 that rotates light by an amount that is tuned to a different selected value of rotation. In such a case, a first private image may be produced using second LCD light modulator 370 to rotate light by a first selected rotation amount that is tuned to the polarization characteristics of a first cross polarizing medium 132 used by a first user 130 so that the image is visible to the first user 130 but not to a second user 130 or user 140, and a second private image may be produced using second LCD light modulator 370 to rotate light by a second selected rotation amount that is tuned to the polarization characteristics of a second cross polarizing medium 132 used by a second user 130 so that the image is visible to the second user 130 but not to the first user 130 or user 140.

It will be understood that the embodiments of FIGS. 3A and 3B are exemplary only, and that a multiple image projection system may be provided in alternative configurations. For example, a first projection assembly and/or a second projection assembly may be provided with any alternative configuration of optics suitable for producing plane polarized light for projection through a LCD light modulator in the manner described herein. Moreover, it will be understood that a multiple image projection system may include three or more projection assemblies, with each projection assembly being configured to project images in overlapping manner onto a projection screen. Although first and second projection assemblies 302 and 304 of FIGS. 3A and 3B are illustrated disposed in adjacent side-by-side position relative to each other, it will be understood that multiple projection assemblies may be alternately disposed in any other relative positions that are suitable for projection of multiple images on a common projection surface in a manner as described elsewhere herein.

Figure 4:
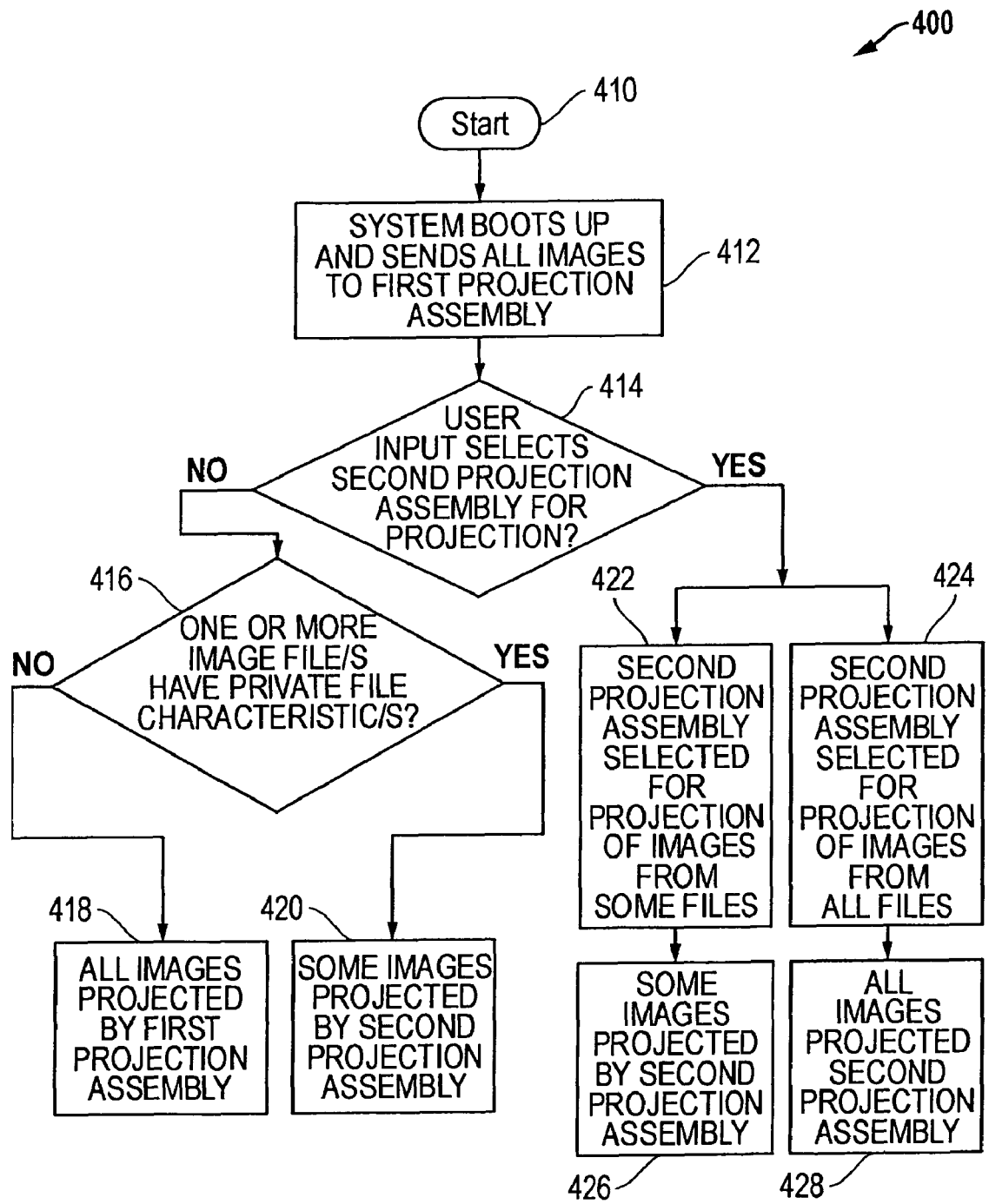
FIG. 4 shows methodology for displaying images using a dual image projection system according to one exemplary embodiment of the disclosed methods and systems.

FIG. 4 shows methodology 400 that may be used by an information handling system 100 to project images onto projection screen 390 from a dual image projection system according to one exemplary embodiment of the disclosed methods and systems. In this regard, methodology 400 may be implemented as a software and/or firmware application executing on one or more processors of an information handling system, e.g., as application 102 of FIG. 4. Thus, the following description of methodology 400 refers to implementation using dual image projection system 300 and information handling system 100 of FIG. 4, however, it will be understood that the methodology of FIG. 4 may be implemented with other combinations of projection system and information handling system hardware and/or other components.

Methodology 400 starts at step 410 and proceeds to step 412 where system 100 boots-up and image display application 102 initially sends all data content (i.e. Windows Desktop and icons, etc.) by default to first projection assembly 302. In this display mode all images projected by dual image projection system 300 onto projection screen 390 are visible to the naked eye without further polarization to any user/s in front projection viewing area 394 and/or rear projection viewing area 396. However, it will be understood that it is also possible that image display application 102 may be alternately configured to send all data content to second projection assembly 304 so that all images projected by dual image projection system 300 are only visible by users 130a and/or 130b with benefit of respective polarizer medium 132a and/or 132b.

Next, image display application 102 determines in step 414 if second projection assembly 304 has been selected for projection of image data onto projection screen 390. For example, a user 130a and/or 130b may select second projection assembly 304 for projection of image data using any suitable I/O device or methodology (e.g., using a button on the dual image projection system, keyboard 114a and/or 114b, icon setting, or other suitable I/O device). When a user so selects second projection assembly 304 for projection of image data, methodology 400 proceeds to either step 422 (i.e., when user selects second projection assembly 304 for projection of image data from some files) or to step 424 (i.e., when user selects second projection assembly 304 for projection of image data from all files). Image display application 102 responds accordingly, i.e., by projecting some images on projection screen 390 using second projection assembly 304 in step 426 (while projecting other images on projection screen 390 using first projection assembly 302), or by projecting all images on projection screen 390 using second projection assembly 304 in step 428. In either case, all images projected by second projection assembly 304 on projection screen 390 are only visible by 130a and/or 130b with benefit of respective polarizer medium 132a and/or 132b, while any images simultaneously projected on projection screen 390 by first projection assembly 302 are visible to all users, e.g., users 130a, 130b, 140a, and 140b.

In one exemplary embodiment, image display application 102 may simultaneously send some image data to first projection assembly 302 and some image data to second projection assembly 304 to implement a three dimensional (3D) display mode for projecting 3D content on projection screen 390 from a single common image file (i.e., 3D video game, 3D movie, etc.) from a selected source. In such a case, for example, a device driver of GPU 120, enabled in stereo mode, distributes the 3D content between the 2 stereo channels 322 and 324 to the two respective projection assemblies 356 and 357. In such a case, user 130a and/or 130b (with benefit of polarizer medium 132a and/or 132b) is able to see the content projected from both projection assemblies 356 and 357, thus experiencing the desired 3D effect of the 3D file content. In a further embodiment, image display application 102 may be optionally configured to automatically recognize a 3D image file (i.e., 3D video game, 3D movie, etc.) and to automatically project this type of file in 3D display mode without user instruction or request.

Returning to FIG. 4, if a user has not selected second projection assembly 304 for projection in step 414, then image application 102 may be configured to select between projection assembly 356 or 357 for projection of an image from a given image file on to projection screen 390 based on one or more file characteristics of the image file. Examples of such file characteristics include, but are not limited to, file attribute/s assigned to a given file, file type (e.g., text file, graphic image file, html file, etc.). In one exemplary embodiment, the default viewing setting for an image from any given image file is a "Public Viewable" setting, i.e., the same display setting used in step 412. Using this setting, the image data from the file is sent to the first projection assembly 356 in step 418, e.g., via the front data port (stereo driver mode enabled) from the GPU 120. However, if one or more file characteristics of a given image file indicate a "View Privately" setting selected for the image file, then the image data from the file is sent only to the second projection assembly 357 in step 420, e.g., via the rear data port from the GPU 120.

It will be understood that methodology 400 of FIG. 4 is exemplary only and that the steps may be performed in other embodiments in different order, and/or with lesser or additional steps. Further, the steps of methodology 400 may be configured to repeat in iterative manner, e.g., by returning to step 414 each time one of steps 418, 420, 426 or 428 is reached. In addition, a user may be enabled to modify file characteristics and/or default public/private viewing preferences at any time during operation of methodology 400.

Thus, using the disclosed methods and systems only a user 130a and/or 130b employing an appropriate polarizer medium 132a and/or 132b (e.g., wearing the special polarizer glasses) positioned in the user's line of sight 134a and/or 134b and that is tuned, as the case may be, either to the output polarizer layer 372 (FIG. 3A) or input polarizer layer 374 (FIG. 3B) of second projection assembly 304, is able to view the particular selected "privately viewable" file/content. A given user 140a and/or 140b (having no benefit of a polarizer medium in the user's line of sight 144a and/or 144b) will not be able to see the private viewable content that has been sent to the second projection assembly 304. This allows multiple users 130a and/or 130b to view the selected private content, limited only by the availability of appropriate polarizer medium (e.g., the number of available glasses) for the users and the viewing angle that defines the viewing area 394 and/or 396 of dual image projection system 300. Other users 140a and/or 140b (without benefit of appropriate polarizer medium) in the viewing area of dual image projection system 300 are enabled to see all other publicly viewable content on the projection screen 390 (i.e., Word documents, Web Browsers, pictures, etc.), except for the particular selected private viewable content.

In one exemplary embodiment, a user 130a and/or 130b may be allowed to select images from multiple files to view privately via projection onto projection screen 390 by dual image projection system 300, while also displaying multiple files that other users 140a and/or 140b may publicly view on the same projection screen 390. User 130a and/or 130 may make this selection dynamically and in real time (e.g., via steps 414 and 422 of FIG. 4), or may be allowed to pre-select the identity (e.g., file name and/or file attributes) of specific files and/or file types (e.g., Word document type) for automatic private projection display (e.g., via steps 416, 418 and 420). In one example, a user may be allowed to pre-set file attributes of particular individual files for private projection display (with all other files being publicly viewable by default), or may be enabled to select that images from all files of a specific type (e.g., word documents) be privately displayed.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (UO) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method of displaying images, comprising:
   providing at least first and second display layers, said first display layer being disposed in relationship to said second display layer in a position between said second display layer and a viewing area for viewing images displayed by said first and second display layers, said first display layer being transmissive to images displayed by said second display layer, and the viewing area comprising at least first and second different viewing locations located within the viewing area;
   providing an information handling system coupled to each of said first and second display layers, said information handling system comprising at least one processor configured to process an image file and to selectably display an image from said image file on either of one of said first or second display layers;
   processing a first image file with said information handling system for display of a first image from said image file;
   selectably displaying said first image from said first image file on said second display layer or only on said first display layer based on at least one of a file characteristic of said first image file, a user input, or a combination thereof;
   wherein an image displayed on said second display layer is visible at the second viewing location in the viewing area without further polarization after it passes through said first display layer;
   wherein an image displayed on said first display layer comprises one or more portions of light that are polarized relative to background light displayed on said first display layer such that said image is only visible at the first viewing location in the viewing area when it is cross polarized relative to the polarization of said one or more portions of light; and
   wherein said step of selectably displaying said first image comprises selectably displaying said first image only on said first display layer based on at least one of a file characteristic of said first image file, a user input, or a combination thereof; and wherein said method further comprises:
      providing at least a first human user and a second human user simultaneously positioned at the respective different first and second viewing locations within the viewing area,
      processing a second image file with said information handling system for display of a second image from said second image file,
      selectably displaying said second image from said second image file on said second display layer based on at least one of a file characteristic of said second image file, a user input, or a combination thereof, and
      simultaneously displaying the first image on said first display layer while said second image is displayed on said second display layer so that each of said first image and said second images are simultaneously visible to the first human user at the first viewing location in the viewing area when cross polarized relative to the polarization of said one or more portions of light, and so that at the same time only the second image is visible to the second human user at the second viewing location in the viewing area without further polarization.

2. The method of claim 1, further comprising providing a first output polarizing layer disposed in relationship to said first display layer in a position between said first display layer and said viewing area for viewing images with no input polarizer layer positioned between said first display layer and said second display layer; and wherein an image displayed on said first display layer is only visible at a location in the viewing area when it is cross polarized relative to the polarization imparted by said first polarizing layer.

3. The method of claim 2, wherein each of said first and second display layers comprises a transmissive liquid crystal display (LCD) layer; and wherein said method further comprises providing said second display layer as part of a second transmissive LCD display panel that comprises an input polarizing layer and an output polarizing layer, and providing said first LCD layer as part of a first transmissive LCD display panel that has no input polarizing layer and that comprises said first output polarizing layer as an output polarizing layer for said first LCD panel.

4. The method of claim 1, further comprising providing a first input polarizing layer disposed in relationship to said first display layer in a position between said first display layer and said second display layer with no output polarizer layer positioned between said first display layer and said viewing area for viewing images; and wherein an image displayed on said first display layer is only visible at a location in the viewing area when it is cross polarized relative to the polarization imparted by said first input polarizing layer.

5. The method of claim 4, wherein each of said first and second display layers comprises a transmissive liquid crystal display (LCD) layer; and wherein said method further comprises providing said second display layer as part of a second transmissive LCD display panel that comprises an input polarizing layer and an output polarizing layer, and providing said first LCD layer as part of a first transmissive LCD display panel that has no output polarizing layer and that comprises said first input polarizing layer as an input polarizing layer for said first LCD panel.

6. The method of claim 1, further comprising providing at least one of software, firmware or a combination thereof, said software or firmware being configured to execute on said at least one processor of said information handling system and to select said display of said first image on said second display layer or only on said first display layer based on identification of said file characteristic of said image file, said user input, or a combination thereof; and executing said software or firmware on a processor of said information handling system to identify said file characteristic of said first image file, said user input, or a combination thereof, and to selectably display said first image from said first image file on said second display layer or only on said first display layer based on said file characteristic of said first image file, said user input, or a combination thereof.

7. The method of claim 1, wherein said step of selectably displaying said first image from said first image file comprises displaying said first image only on said first display layer based on a file characteristic of said first image file, said file characteristic comprising a first file attribute.

8. The method of claim 7, further comprising processing said first image file with said information handling system to provide said first image file with said first file attribute in response to a user input, prior to processing said first image file with said information handling system for display of said first image from said first image file.

9. The method of claim 1, wherein said step of selectably displaying said first image from said first image file comprises displaying said first image only on said first display layer based on a user input to said information handling system.

10. The method of claim 9, wherein said step of selectably displaying said first image from said first image file further comprises first displaying said first image on said second display layer; and then displaying said first image only on said first display layer based on a real time user input provided to said information handling system while said first image is displayed on said second display layer.

11. The method of claim 1, wherein said first image is different from said second image; and wherein at least a portion of said first image and at least a portion of said second image overlap with each other when viewed from said first viewing location in the viewing area.

12. The method of claim 1, further comprising providing a polarizer medium for a user positioned at said first viewing location; said polarizer medium being configured to cross-polarize said image displayed on said first display layer relative to the polarization of said one or more portions of light so that said image displayed on said first display layer is visible to said user at said first viewing location.

13. The method of claim 1, further comprising cross-polarizing and simultaneously viewing the first image and the second image with the first human user at the first viewing location in the viewing area; and at the same time viewing the second image with the second human user at the second viewing location in the viewing area without further polarization.

14. A method of displaying images, comprising:
providing at least first and second display layers, said first display layer being disposed in spaced relationship to said second display layer in a position between said second display layer and a viewing area for viewing images displayed by said first and second display layers, said first display layer being transmissive to images displayed by said second display layer;
displaying an image on at least one of said first or second display layers;
wherein an image displayed on said second display layer is visible in the viewing area without further polarization after it passes through said first display layer and said first polarizing layer;
wherein an image displayed on said first display layer comprises one or more portions of light that are polarized relative to background light displayed on said first display layer such that said image is only visible in the viewing area when it is cross polarized relative to the polarization of said one or more portions of light; and
wherein said step of displaying comprises simultaneously displaying a first image to a first user positioned in the viewing area on said first display layer and a second image to a second user simultaneously positioned in the viewing area on said second display layer, each of said first image and said second images being simultaneously visible to said first user in the viewing area when cross polarized relative to the polarization of said one or more portions of light, and so that at the same time only said second image is visible to said second user in the viewing area without further polarization.

15. The method of claim 14, further comprising providing a first output polarizing layer disposed in relationship to said first display layer in a position between said first display layer and said viewing area with no input polarizer layer positioned between said first display layer and said second display layer; and wherein an image displayed on said first display layer is only visible in the viewing area when it is cross polarized relative to the polarization imparted by said first polarizing layer.

16. The method of claim 15, wherein each of said first and second display layers comprises a transmissive liquid crystal display (LCD) layer; and wherein said method further comprises providing said second display layer as part of a second transmissive LCD display panel that comprises an input polarizing layer and an output polarizing layer, and providing said first LCD layer as part of a first transmissive LCD display panel that has no input polarizing layer and that comprises said first output polarizing layer as an output polarizing layer for said first LCD panel.

17. The method of claim 14, further comprising providing a first input polarizing layer disposed in relationship to said first display layer in a position between said first display layer and said second display layer with no output polarizer layer positioned between said first display layer and said viewing area; and wherein an image displayed on said first display layer is only visible in said viewing area when it is cross polarized relative to the polarization imparted by said first input polarizing layer.

18. The method of claim 17, wherein each of said first and second display layers comprises a transmissive liquid crystal display (LCD) layer; and wherein said method further comprises providing said second display layer as part of a second transmissive LCD display panel that comprises an input polarizing layer and an output polarizing layer, and providing said first LCD layer as part of a first transmissive LCD display panel that has no output polarizing layer and that comprises said first input polarizing layer as an input polarizing layer for said first LCD panel.

19. The method of claim 14, further comprising providing at least one of software, firmware or a combination thereof, said software or firmware being configured to execute on at least one processor of an information handling system; and executing said software or firmware on at least one processor of said information handling system to selectably display said image on at least one of said first or second display layers.

20. The method of claim 14, wherein said first image is different from said second image.

21. The method of claim 14, wherein at least a portion of said first image and at least a portion of said second image overlap with each other when viewed by said first user in the viewing area when cross polarized relative to the polarization of said one or more portions of light.

22. An information handling system configured for coupling to a display system or a projection system, said information handling system comprising:
  at least one processor configured to process a first image file, said at least one processor being configured to selectably provide image data from said first image file for either of:
    display of an image on a second display layer of said display system to a viewing area or for projection by a second projection assembly of said projection system to the viewing area, such that the image displayed on the second display layer or projected by the second projection assembly is visible in the viewing area without further polarization, or
    only for display of an image on a first display layer of said display system to the viewing area or only for projection by a first projection assembly of said projection system to the viewing area, such that the image displayed on the first display layer or projected by the first projection assembly comprises one or more portions of light that are polarized such that said image is only visible in the viewing area when it is cross polarized relative to the polarization of said one or more portions of light; and
  an image display application configured to execute on said at least one processor and to select said first image based on identification of said file characteristic of said image file, said user input, or a combination thereof as either of:
    a publicly viewable file for display on said second display layer or for projection on said second projection assembly, or
    a privately viewable file for display only on said first display layer or for projection on said first projection assembly; and
  where the image display application is further configured to simultaneously display or project the first image to a first user positioned in the viewing area on the first display layer or first projection assembly and the second image to a second user simultaneously positioned in the viewing area on the second display layer or second projection assembly, such that each of the first image and the second image are simultaneously visible to the first user in the viewing area when cross polarized relative to the polarization of the one or more portions of light, and so that at the same time only the second image is visible to the second user in the viewing area without further polarization.

23. The system of claim 22, wherein said image display application is configured to provide said first image from said first image file as a privately viewable file only for display on said first display layer or only for projection by said first image projection assembly based on a file characteristic of said first image file, said file characteristic comprising a first file attribute; and wherein said image display application is configured to provide said first image file with said first file attribute in response to a user command, prior to processing said first image file for display of said first image from said first image file.

24. The system of claim 22, wherein said image display application is configured to provide said first image as a privately viewable file only for display on said first display layer or only for projection by said first image projection assembly based on a user input to said information handling system.

25. The system of claim 22, wherein said image display application is configured to:
  select said first image as a privately viewable file for display only on said first display layer or for projection only by said first image projection assembly based on at least one of a file characteristic of said first image file, a user input, or a combination thereof;
  select a second image from a second image file as a publicly viewable file for display on said second display layer or for projection only by said first image projection assembly based on at least one of a file characteristic of said second image file, a user input, or a combination thereof;
  wherein said image display application is further configured to select said first image as privately viewable file for display on said first display layer or projection by said first image projection system simultaneously with display of said second image as a publicly viewable file on said second display layer of projection of said second image as a publically viewable file on said second projection assembly, said first image being different than said second image.

26. The system of claim 22, where the information handling system is configured for coupling to a display system, said information handling system comprising:
  at least one processor configured to process a first image file, said at least one processor being configured to selectably provide image data from said first image file for either of:
    display on a second display layer of said display system, or
    only for display on a first display layer of said display system; and
  an image display application configured to execute on said at least one processor and to select said first image based on identification of said file characteristic of said image file, said user input, or a combination thereof as either of:
    a publicly viewable file for display on said second display layer, or a privately viewable file for display only on said first display layer.

27. The system of claim 22, where the information handling system is configured for coupling to a display system, said information handling system comprising:
- at least one processor configured to process a first image file, said at least one processor being configured to selectably provide image data from said first image file for either of:
  - projection by a second projection assembly of said projection system, or
  - only for projection by a first projection assembly of said projection system; and
- an image display application configured to execute on said at least one processor and to select said first image based on identification of said file characteristic of said image file, said user input, or a combination thereof as either of:
  - a publicly viewable file for projection on said second projection assembly, or
  - a privately viewable file for projection only on said first projection assembly.

* * * * *